(12) United States Patent
Suzuki

(10) Patent No.: US 8,432,139 B2
(45) Date of Patent: Apr. 30, 2013

(54) DC-DC CONVERTER

(75) Inventor: Takamune Suzuki, Saitama (JP)

(73) Assignee: Sanken Electric Co., Ltd., Saitama-Ken (JP)

( * ) Notice: Subject to any disclaimer, the term of this patent is extended or adjusted under 35 U.S.C. 154(b) by 0 days.

(21) Appl. No.: 13/354,869

(22) Filed: Jan. 20, 2012

(65) Prior Publication Data

US 2012/0187934 A1    Jul. 26, 2012

(30) Foreign Application Priority Data

Jan. 25, 2011   (JP) .................................. 2011-013466

(51) Int. Cl.
*G05F 1/40*    (2006.01)

(52) U.S. Cl.
USPC .............................. 323/222; 323/285; 323/288

(58) Field of Classification Search .................. 323/222, 323/282–285, 288, 351; 326/88
See application file for complete search history.

(56) References Cited

U.S. PATENT DOCUMENTS

| | | | |
|---|---|---|---|
| 7,106,105 B2* | 9/2006 | Bryson | 326/88 |
| 7,307,406 B2* | 12/2007 | Shirai et al. | 323/285 |
| 7,514,731 B2* | 4/2009 | Shiraishi et al. | 257/288 |
| 7,514,908 B2* | 4/2009 | Hosokawa et al. | 323/222 |
| 8,063,620 B2* | 11/2011 | Hosokawa et al. | 323/282 |
| 8,207,558 B2* | 6/2012 | Shiraishi et al. | 257/268 |

FOREIGN PATENT DOCUMENTS

JP    2006-280014 A    10/2006

\* cited by examiner

*Primary Examiner* — Jessica Han
(74) *Attorney, Agent, or Firm* — Wilmer Cutler Pickering Hale and Dorr LLP

(57) ABSTRACT

A DC-DC converter includes: a high-side MOSFET as a main switching element which is driven by using a bootstrap capacitor; a low-side MOSFET as a synchronous rectifier, wherein a series circuit of the high-side MOSFET and the low-side MOSFET is connected to a DC power supply; and a coil and a smoothing capacitor, which are serially connected between the drain and the source of the low-side MOSFET; an overvoltage protection unit, which clamps an overvoltage; an overcurrent interrupting unit, which interrupts an overcurrent that flows when the overvoltage protection unit clamps the overvoltage; and a protection circuit, wherein the protection circuit includes: a differential-voltage detecting unit detecting the voltage of both ends of the bootstrap capacitor; and a control unit that, when the voltage detected by the differential-voltage detecting unit exceeds a predetermined value, turns OFF the low-side MOSFET and turns ON the high-side MOSFET.

2 Claims, 3 Drawing Sheets

FIG.1 -BACKGROUND ART-
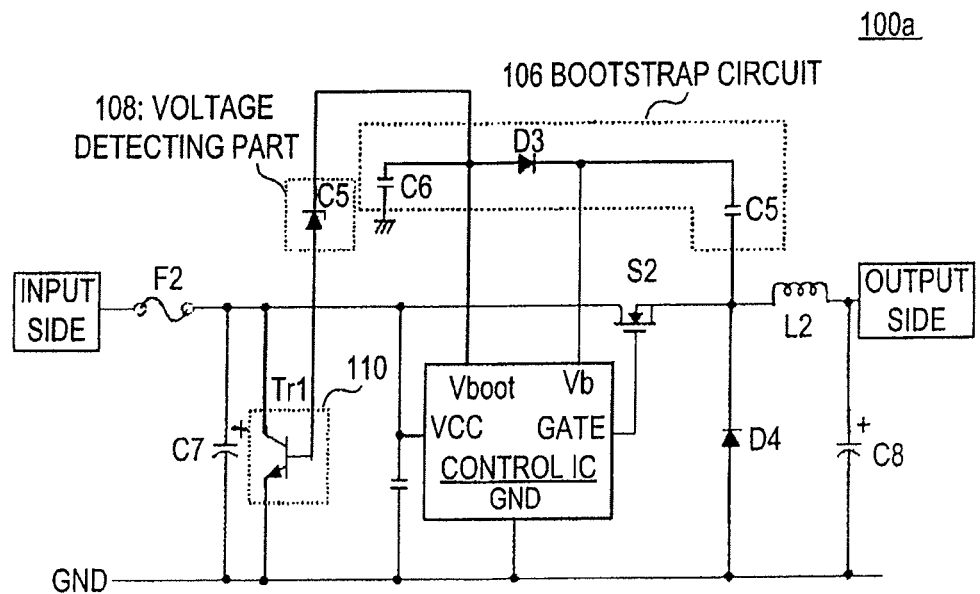
FIG.2 -BACKGROUND ART-
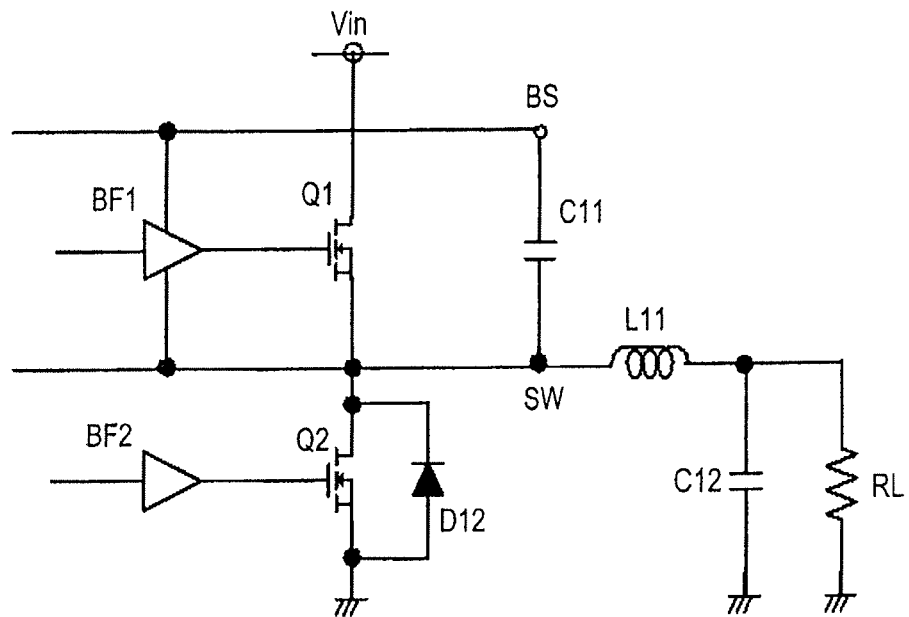

DC-DC CONVERTER

CROSS-REFERENCE TO RELATED APPLICATION

This application claims priority from Japanese Patent Application No. 2011-013466 filed on Jan. 25, 2011, the entire subject matter of which is incorporated herein by reference.

TECHNICAL FILED

This disclosure relates to a DC-DC converter.

BACKGROUND

FIG. 2 is a circuit diagram illustrating a part of a general configuration of a step-down DC-DC converter. The DC-DC converter shown in FIG. 2 is a step-down DC-DC converter, which uses an N-channel Metal Oxide Semiconductor Field Effect Transistor (MOSFET) at a high-side, and a N-channel MOSFET for synchronous rectification is connected at a low-side to reduce a loss of a flywheel diode D12 and to increase the power conversion efficiency. An input voltage Vin is applied to a drain terminal of the high-side MOSFET Q1, and the drain terminal of the low-side MOSFET Q2 is connected to a source terminal of the high-side MOSFET Q1. One end of a coil L11 is connected to a connection point where the high-side MOSFET Q1 and the low-side MOSFET Q2 are connected, and a smoothing capacitor C12 and a load RL are connected between the other end of the coil L11 and the GND. The coil L11 and the smoothing capacitor C12 configure a direct current smoothing circuit at an output part of the DC-DC converter. The drive circuit of the high-side MOSFET Q1 comprises a bootstrap capacitor C11, which supplies an approximately constant voltage to a buffer circuit BF1 based on the electric potential of the source terminal of the high-side MOSFET Q1 (the electric potential of the terminal SW shown in FIG. 2), in order to provide a voltage higher than the input voltage Vin to the buffer circuit BF1 and the gate terminal of the high-side MOSFET Q1.

In the DC-DC converter, the high-side MOSFET Q1 and the low-side MOSFET Q2 are controlled to be ON/OFF, in response to inputting a high-side drive signal into the gate terminal of the high-side MOSFET Q1 through the buffer circuit BF1 and inputting a low-side drive signal into the gate terminal of the low-side MOSFET Q2 through a buffer circuit BF2.

In the above-described DC-DC converter, due to use the N-channel MOSFET as a switching element at the high-side of the power supply device, it is necessary to raise the voltage of the gate electrode of the MOSFET to be higher than the input voltage Vin. A bootstrap circuit, which uses the bootstrap capacitor C11, is used for this purpose. However, when the terminal to which the input voltage Vin is applied and the terminal to which the bootstrap voltage is applied (the terminal BS shown in FIG. 2) are shorted by adhesion of dust or the like, since the input voltage Vin is applied between the terminal BS and the terminal SW, each of a withstand voltage of the buffer circuit BF1 between the terminal BS and the terminal SW, a withstand voltage between the gate and the source of the high-side MOSFET Q1 and a withstand voltage between the gate and the drain of the high-side MOSFET Q1 are exceeded, and thus the buffer circuit and MOSFET Q1 may be broken down and shorted.

Such short between the drain and the source of the high-side MOSFET Q1 due to the breakdown of withstand may be caused when the low-side MOSFET Q2 is turned on, in which the voltage of the terminal SW becomes Low. At this time, because a through current flows through the high-side MOSFET Q1 and the low-side MOSFET Q2 from the Vin to the GND, the Area of Safe Operation (ASO) breakdown of the low-side MOSFET Q2 is also caused by the overcurrent. Further, when the low-side MOSFET Q2 is broken, excessive current flows between the Vin and the GND, and the product may be broken due to intense damages.

In view of this, a protection circuit is proposed. When the voltage of the bootstrap circuit increases due to some abnormality as above and thus the switching elements cannot be normally turned on and off, the protection circuit interrupts the power supply to the switching elements, and thus safety is improved by suppressing damages of the switching elements (for example, refer to JP-A-2006-280014).

FIG. 1 is the circuit diagram of an example of power supply devices including a protection circuit and a bootstrap circuit. In FIG. 1, a bootstrap circuit 106 includes capacitors C5 and C6, and a diode D3. Further, the protection circuit includes a diode D5 as a voltage detecting part, a transistor Tr1 and a fuse F2.

Behaviors of the bootstrap circuit 106 will be described below. The GND of the bootstrap circuit 106 is a floating GND, which is connected to the source terminal of a switching element S2. Thus, the terminal Vb of the bootstrap circuit 106 is always kept higher than the source terminal voltage of the switching element S2 as the terminal voltage Vboot, namely the charging voltage of the capacitor C6, regardless of ON/OFF of the switching element S2. This is because the capacitor C5 is charged by the capacitor C6 through the diode D3 when the switching element S2 is turned on.

When the bootstrap circuit 106 works normally, the bootstrap circuit 106 control the switching element S2 to turn ON/OFF by repeating the charging and discharging of the capacitors C5 and C6. On the other hand, when the diode D3 in the bootstrap circuit 106 is shorted due to some abnormality and the voltage of the terminal Vboot of the control IC increases, the diode D5 is turned on and thus the transistor Tr1 is turned on. Therefore, the input and the GND are shorted, and the fuse F2 is meltdown. The power supply to the switching element S2 is interrupted by such behaviors, and operations of the switching element S2 is stopped. Therefore, damages of the switching element S2 is to be suppressed and safety is to be improved.

SUMMARY

However, in the protection circuit used for the above-described bootstrap circuit 106, because the transistor Tr1, which makes the input and the GND short, is required to discharge a combined current of the interrupting current of the fuse F2 and the charging current of the capacitor C7, it is necessary to use a big transistor which has a current specification or an area of safe operation, meeting this requirement.

In view of the above, this disclosure to provide a DC-DC converter whose safety is improved.

A DC-DC converter of one aspect of this closure, which is a synchronous step-down DC-DC converter, the DC-DC converter comprises: a high-side MOSFET as a main switching element which is driven by using a bootstrap capacitor; a low-side MOSFET as a synchronous rectifier, wherein a series circuit of the high-side MOSFET and the low-side MOSFET is connected to a DC power supply; and a coil and a smoothing capacitor, which are serially connected between the drain and the source of the low-side MOSFET, wherein a direct current is output from the terminals of the smoothing capacitor by turning ON/OFF the high-side MOSFET and the low-side MOSFET complementarily; an overvoltage protection unit, which clamps an overvoltage when the direct current output voltage of the smoothing capacitor exceeds a predetermined value; an overcurrent interrupting unit, which interrupts an overcurrent that flows when the overvoltage protection unit clamps the overvoltage; and a protection circuit, wherein the protection circuit comprises: a differential-voltage detecting unit detecting the voltage of both ends of the bootstrap capacitor; and a control unit that, when the voltage detected by the differential-voltage detecting unit exceeds a predetermined value, turns OFF the low-side MOSFET and turns ON the high-side MOSFET.

A DC-DC converter of another aspect of this disclosure, which is a synchronous step-down DC-DC converter, the DC-DC converter comprises: a high-side MOSFET as a main switching element which is driven by using a bootstrap capacitor; a low-side MOSFET as a synchronous rectifier, wherein a series circuit of the high-side MOSFET and the low-side MOSFET is connected to a DC power supply; and a coil and a smoothing capacitor, which are serially connected between the drain and the source of the low-side MOSFET, wherein a direct current is output from the terminals of the smoothing capacitor by turning ON/OFF the high-side MOSFET and the low-side MOSFET complementarily; and a protection circuit, wherein the protection circuit comprises: a differential-voltage detecting unit detecting the voltage of both ends of the bootstrap capacitor; a control unit that, when the voltage detected by the differential-voltage detecting means exceeds a predetermined value, turns OFF the low-side MOSFET, a switching element which is connected in parallel with the bootstrap capacitor; a voltage detecting unit, when the voltage of both ends of the bootstrap capacitor exceeds a predetermined value, turns ON the switching element; and an element, which is provided between the terminal of the bootstrap capacitor at the high voltage side and the drain terminal of the switching element, and which is meltdown due to a current that flows when the switching element is turned on.

This disclosure is to provide the DC-DC converter in which safety is improved when the terminal, to which the input voltage is applied, and the terminal, to which the bootstrap voltage is applied, are shorted.

BRIEF DESCRIPTION OF THE DRAWINGS

The foregoing and additional features and characteristics of this disclosure will become more apparent from the following detailed descriptions considered with the reference to the accompanying drawings, wherein:

FIG. 1 is a circuit diagram illustrating a switching control circuit including a protection circuit according to background art;

FIG. 2 is a circuit diagram illustrating a synchronous step-down DC-DC converter according to background art;

DETAILED DESCRIPTION

Next, the illustrative embodiments of this disclosure will be explained in detail with reference to the drawings.

Figure 3:
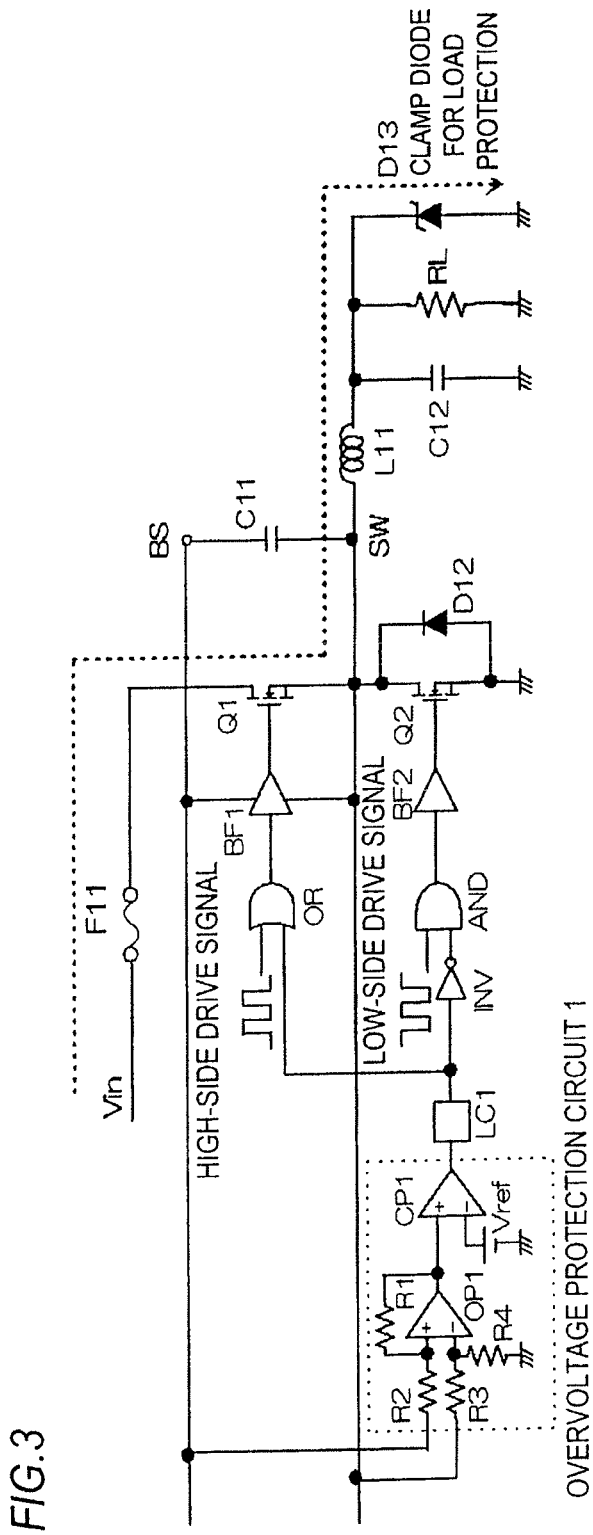
FIG. 3 is a circuit diagram illustrating a DC-DC converter of an illustrative embodiment 1 of this disclosure.

(Illustrative embodiment 1) The illustrative embodiment 1 of this disclosure is shown in FIG. 3 in which a DC-DC converter includes a bootstrap circuit.

In FIG. 3, a power MOSFET used as the high-side switching element is shown by a symbol Q1, and a power MOSFET used as the low-side switching element is shown by a symbol Q2. An input voltage Vin is applied to the drain terminal of the high-side MOSFET Q1 through a fuse F11, and the source terminal of the high-side MOSFET Q1 is connected to the drain terminal of the low-side MOSFET Q2. One end of a coil L11 is connected to the connection point where the high-side MOSFET Q1 and the low-side MOSFET Q2 are connected, and a smoothing capacitor C12, a load RL and a clamp diode D13 for load protection are connected between the other end of the coil L11 and the GND. The coil L11 and the smoothing capacitor C12 configure a direct current smoothing circuit at an output part of the DC-DC converter. One end of a bootstrap capacitor C11 is connected to a terminal SW, and the other end of the bootstrap capacitor C11 is connected to a terminal BS. Thus, the bootstrap capacitor C11 is charged by applied a predetermined voltage generated by a regulator (not shown) through a back-flow preventing diode (not shown) and the terminal BS, and thus a bootstrap voltage is generated. A potential difference between a voltage of the output signal of the buffer circuit BF1 and a voltage of the terminal SW is generated by the bootstrap voltage, and the potential difference is to be higher than a gate threshold voltage of the high-side MOSFET Q1. Therefore, the high-side MOSFET Q1 is turned on, and current is flown to the terminal SW through the drain and the source of the high-side MOSFET Q1.

Complementary drive signals are input into the gate terminals of the high-side MOSFET Q1 and the low-side MOSFET Q2, respectively. In other words, drive signal input terminals whose signals are input from a drive signal generating circuit (not shown) are connected to one of the input terminals of an OR-circuit OR and an AND-circuit AND, respectively. Further, an output signal from the overvoltage protection circuit 1 is connected through the latch circuit LC1 to the other input terminal of the OR-circuit OR, and to the other of the input terminals of the AND-circuit AND through an inverter circuit INV, respectively. The output of the OR-circuit OR is connected to the gate terminal of the high-side MOSFET Q1 through a buffer circuit BF1. The output of the AND-circuit AND is connected to the gate terminal of the low-side MOSFET Q2 through a buffer circuit BF2.

The overvoltage protection circuit 1 detects an overvoltage by comparing the potential difference between the electric potentials of both ends of the bootstrap capacitor C11, namely the electric potentials between the terminal BS and the terminal SW shown in FIG. 3, with a reference voltage Vref. The potential difference between the terminal BS and the terminal SW is detected by a differential amplifier, which is configured by an operational amplifier OP1 and resistors R1-R4, and the output from the differential amplifier is connected to the non-inverting input terminal of a comparator CP1. On the other hand, Vref being the reference voltage is supplied to the inverting input terminal of the comparator CP1. Through a latch circuit LC1, the output of the comparator CP1 is connected to the input terminal of the OR-circuit OR side to which the drive signal input terminal is not connected, as stated above, and is connected to the input terminal of the AND-circuit AND to which the drive signal input terminal is not connected further through an inverter circuit INV.

When the bootstrap circuit works normally, the bootstrap capacitor C11 stably controls the ON/OFF of the high-side MOSFET Q1 by repeating the charging and discharging of energy. The overvoltage protection circuit 1 compares the potential difference between the terminal SW and the terminal BS with the reference voltage Vref, and the output of the comparator CP1 usually becomes a signal of Low.

However, when the terminal, to which the input voltage is applied, and the terminal BS, to which the bootstrap voltage is applied, are shorted due to adhesion of dust or the like and when the low-side MOSFET Q2 is turned on, since the potential difference between the terminal BS and the terminal SW, at first, becomes higher than the normal state, the potential difference is converted and then output by the differential amplifier configured by the operational amplifier OP1 and the resistors R1-R4. Then, when the potential difference signal converted by the differential amplifier is compared with the reference voltage Vref by the comparator CP1 and exceed the threshold, a signal of High is output from the comparator CP1. The signal output from the comparator CP1 is connected through the latch circuit LC1 to the input terminal of the OR-circuit OR, to which the drive signal input terminal is not connected, and the input terminal of the AND-circuit AND, to which the drive signal input terminal is not connected, through an inverter circuit INV, respectively.

Since a signal of High output by the latch circuit LC1 is input to the input terminal of the OR-circuit OR, to which the drive signal input terminal of is not connected, a signal of High is always output from the OR-circuit OR, regardless of the input drive signal input to the other input terminal of the OR-circuit OR. This output signal is input to the gate terminal of the high-side MOSFET Q1 through the buffer circuit BF1, and then the high-side MOSFET Q1 is kept being ON, namely, the drain and the source are conducted.

On the other hand, since the output of the latch circuit LC1 is input through the inverter circuit INV into the input terminal of the AND-circuit AND, to which the drive signal input terminal is not connected, a signal of Low is output from the inverter circuit INV and input into one of the input terminals of the AND-circuit AND. Therefore, regardless of the drive signal input into the other input terminal of the AND-circuit AND, a signal of Low is always output from the AND-circuit AND and is input into the gate terminal of the low-side MOSFET Q2 through a buffer circuit BF2. Thus, the drain and the source of the low-side MOSFET Q2 are kept in an interrupted condition.

In this case, the current flows through a path of the fuse F11 connected to the input power supply line, the high-side MOSFET Q1 and coil L11 which is connected to the source terminal of the high-side MOSFET Q1, and flows to the clamp diode D13 for load protection (described by the dotted arrow line). The fuse F11 connected to the input power supply line is meltdown, and thus the voltage from the power supply line is interrupted.

According to this configuration, since the through current from the power supply line to the GND is suppressed and the voltage from the power supply line is to be interrupted, fuming, burning and exploding sound, etc., of the high-side MOSFET Q1 and the low-side MOSFET Q2 is suppressed and safety is to be improved.

Figure 4:
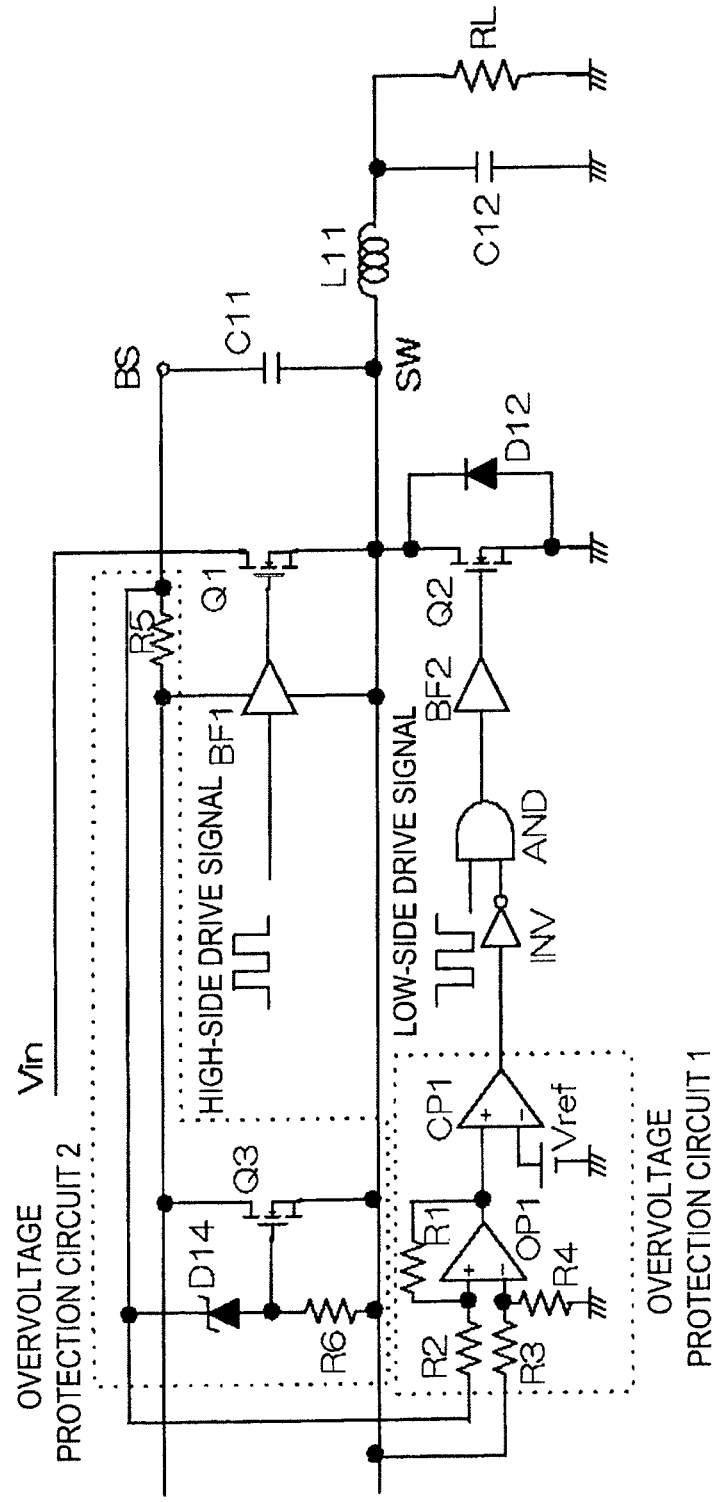
FIG. 4 is a circuit diagram illustrating a DC-DC converter of an illustrative embodiment 2 of this disclosure.

(Illustrative embodiment 2) The illustrative embodiment 2 of this disclosure is shown in FIG. 4 in which a DC-DC converter includes a bootstrap circuit.

The illustrative embodiment 2 includes an overvoltage protection circuit 2 between the terminal BS and the terminal SW instead of the OR-circuit OR and the latch circuit LC1 in the DC-DC converter of illustrative embodiment 1. The overvoltage protection circuit 2 includes a resistor R5, which is connected between the terminal BS and the buffer circuit BF1, a N-channel MOSFET Q3, of which drain electrode is connected to the terminal BS and of which source electrode is connected to the terminal SW, and a zener diode D14 and a resistor R6 which are connected between the terminal BS and the terminal SW.

In the above overvoltage protection circuit 2, when the terminal, to which an input voltage is applied, and the terminal BS, to which the bootstrap voltage is applied, are shorted due to some abnormality, the zener diode D14 is turned on by a potential difference produced between the terminal BS and the terminal SW, and the N-channel MOSFET Q3 is turned on. Accordingly, the drain and the source of the N-channel MOSFET Q3 are conducted, and an excessive current flow through the resistor R5 that is connected between the terminal BS and the buffer circuit BF1, and thus the resistor R5 is meltdown due to the excessive current. Since the bootstrap capacitor C11 and the buffer circuit BF1 are cut off after the resistor R5 is meltdown, an overvoltage will not be applied to the buffer circuit BF1 and the gate of the high-side MOSFET Q1. Thus, the buffer circuit BF1 and the high-side MOSFET Q1 are protected. In addition, since the bootstrap capacitor C11 and the buffer circuit BF1 are cut off, the high-side MOSFET Q1 cannot be turned on. Even in this case, the overvoltage protection circuit 1 functions as the same as that of the illustrative embodiment 1 described above. Therefore, even if the terminal, to which the input voltage is applied, and the terminal BS, to which the bootstrap voltage is applied, are shorted in the timing that the low-side MOSFET Q2 is on, since the drain and the source of the low-side MOSFET Q2 are cut off instantly, the through current between the Vin and the GND does not flow. Accordingly, it is possible to protect the high-side MOSFET Q1 and the low-side MOSFET Q2 without damages. Further, by using a thin film resistor as the resistor connected between the terminal BS and the buffer circuit BF1, the fuming when melting due to the overcurrent is suppressed, and the power supply line is to be safely cut off.

Thus, since the Vin is cut off by the melting of the resistor R5, it is not necessary to provide usually the externally attached fuse F11 and the clamp diode D13 for load protection, and it is possible to improving safety and to reduce the number of externally attached elements.

What is claimed is:

1. A DC-DC converter, which is a synchronous step-down DC-DC converter, the DC-DC converter comprising:
    a high-side MOSFET as a main switching element, which is driven by using a bootstrap capacitor;
    a low-side MOSFET as a synchronous rectifier, wherein a series circuit of the high-side MOSFET and the low-side MOSFET is connected to a DC power supply; and
    a coil and a smoothing capacitor, which are serially connected between the drain and the source of the low-side MOSFET, wherein a direct current is output from the terminals of the smoothing capacitor by turning ON/OFF the high-side MOSFET and the low-side MOSFET complementarily;
    an overvoltage protection unit, which clamps an overvoltage when the direct current output voltage of the smoothing capacitor exceeds a predetermined value;
    an overcurrent interrupting unit, which interrupts an overcurrent that flows when the overvoltage protection unit clamps the overvoltage; and
    a protection circuit,
    wherein the protection circuit comprises:
        a differential-voltage detecting unit detecting the voltage of both ends of the bootstrap capacitor; and
        a control unit that, when the voltage detected by the differential-voltage detecting unit exceeds a predetermined value, turns OFF the low-side MOSFET and turns ON the high-side MOSFET.

2. A DC-DC converter, which is a synchronous step-down DC-DC converter, the DC-DC converter comprising:
- a high-side MOSFET as a main switching element, which is driven by using a bootstrap capacitor;
- a low-side MOSFET as a synchronous rectifier, wherein a series circuit of the high-side MOSFET and the low-side MOSFET is connected to a DC power supply; and
- a coil and a smoothing capacitor, which are serially connected between the drain and the source of the low-side MOSFET, wherein a direct current is output from the terminals of the smoothing capacitor by turning ON/OFF the high-side MOSFET and the low-side MOSFET complementarily; and
- a protection circuit, wherein the protection circuit comprises:
- a differential-voltage detecting unit detecting the voltage of both ends of the bootstrap capacitor;
- a control unit that, when the voltage detected by the differential-voltage detecting means exceeds a predetermined value, turns OFF the low-side MOSFET,
- a switching element which is connected in parallel with the bootstrap capacitor;
- a voltage detecting unit, when the voltage of both ends of the bootstrap capacitor exceeds a predetermined value, turns ON the switching element; and
- an element, which is provided between the terminal of the bootstrap capacitor at the high voltage side and the drain terminal of the switching element, and which is meltdown due to a current that flows when the switching element is turned on.

* * * * *